United States Patent
Mishra et al.

(10) Patent No.: US 9,585,422 B2
(45) Date of Patent: Mar. 7, 2017

(54) HOLLOW/POROUS FIBERS AND APPLICATIONS THEREOF

(71) Applicant: Philip Morris USA Inc., Richmond, VA (US)

(72) Inventors: Munmaya K. Mishra, Manakin Sabot, VA (US); Harrison L. Yu, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 977 days.

(21) Appl. No.: 13/863,920

(22) Filed: Apr. 16, 2013

(65) Prior Publication Data

US 2013/0319432 A1 Dec. 5, 2013

Related U.S. Application Data

(62) Division of application No. 12/314,871, filed on Dec. 18, 2008, now Pat. No. 8,453,653.

(60) Provisional application No. 61/008,303, filed on Dec. 20, 2007.

(51) Int. Cl.

| | |
|---|---|
| *A24B 15/28* | (2006.01) |
| *A24D 3/02* | (2006.01) |
| *A24D 3/06* | (2006.01) |
| *A24D 3/08* | (2006.01) |
| *A24D 3/14* | (2006.01) |
| *B01D 69/08* | (2006.01) |
| *B01D 71/38* | (2006.01) |
| *C08L 31/04* | (2006.01) |
| *C08L 33/02* | (2006.01) |
| *C08L 33/08* | (2006.01) |
| *D01F 6/52* | (2006.01) |

(52) U.S. Cl.
CPC ........ *A24D 3/0204* (2013.01); *A24D 3/065* (2013.01); *A24D 3/08* (2013.01); *A24D 3/14* (2013.01); *B01D 69/08* (2013.01); *B01D 69/082* (2013.01); *B01D 71/38* (2013.01); *C08L 31/04* (2013.01); *C08L 33/02* (2013.01); *C08L 33/08* (2013.01); *D01F 6/52* (2013.01); *B01D 2325/025* (2013.01); *Y10T 428/2933* (2015.01); *Y10T 428/2973* (2015.01); *Y10T 428/2975* (2015.01)

(58) Field of Classification Search
CPC D01D 5/24; D01D 5/247; D01D 5/08; D01D 5/082; D01F 8/00; D01F 1/08; B01D 69/08
See application file for complete search history.

(56) References Cited

U.S. PATENT DOCUMENTS

| | | |
|---|---|---|
| 2,850,471 A | 9/1958 | Klein |
| 3,608,564 A | 9/1971 | Takahashi et al. |
| 3,634,295 A | 1/1972 | Dunlap et al. |
| 4,200,704 A | 4/1980 | Stanley et al. |
| 4,338,417 A | 7/1982 | Heslinga et al. |
| 4,539,348 A | 9/1985 | Gajria et al. |
| 4,692,494 A | 9/1987 | Sonenstein |
| 4,724,242 A | 2/1988 | Vassileff |
| 4,915,839 A | 4/1990 | Marinaccio et al. |
| 4,921,651 A | 5/1990 | Polak et al. |
| 4,966,171 A | 10/1990 | Serrano et al. |
| 5,019,262 A | 5/1991 | Wang |
| 5,171,777 A | 12/1992 | Kuphal et al. |
| 5,286,449 A * | 2/1994 | Kuroda ............... A61M 1/3679 210/490 |
| 5,292,783 A | 3/1994 | Buchanan et al. |
| 5,319,027 A | 6/1994 | Bott et al. |
| 5,364,627 A | 11/1994 | Song |
| 5,446,079 A | 8/1995 | Buchanan et al. |

(Continued)

FOREIGN PATENT DOCUMENTS

| | | |
|---|---|---|
| GB | 1343170 A | 1/1974 |
| GB | 2090603 A | 7/1982 |

(Continued)

OTHER PUBLICATIONS

Partial International Search Report mailed Apr. 2, 2009 for PCT/EP2008/011109.
International Search Report and Written Opinion mailed Oct. 7, 2009 for PCT/EP2008/011109.
Examination Report dated Feb. 14, 2011 for New Zealand Appln. No. 585966.
International Preliminary Report on Patentability issued Jun. 22, 2010 for PCT/EP2008/011109.
Official Action dated Oct. 8, 2011 for Chinese Patent Appln. No. 200880121756.4.

(Continued)

*Primary Examiner* — Michael H Wilson
*Assistant Examiner* — Dionne Walls Mayes
(74) *Attorney, Agent, or Firm* — Buchanan Ingersoll & Rooney PC

(57) ABSTRACT

In one embodiment is provided a polymer blend of poly (vinyl acetate) (PVAc) and poly(acrylic acid) (PAA), wherein the poly(vinylacetate) is present in an amount ranging between about 20 wt % and about 80 wt %, and poly(acrylic acid) is present in an amount ranging between about 80 wt % and about 20 wt %, based on the total weight of the blend. In another embodiment is provided a fiber produced from this polymer blend, and which has cells therein. In another embodiment is provided a flavorant release material comprising the porous fiber disclosed herein, and one or more flavorants disposed in a longitudinally extending core within the fiber. In another embodiment is provided a polymer fiber membrane containing a hollow, porous fiber formed from the polymer blend disclosed herein. In another embodiment is provided a filter containing the fiber described herein. In another embodiment is provided a process for producing the fibers disclosed herein by addition of the polymers to an extruder or blender, and extruding or melt spinning the mixture into a fiber containing cells therein.

19 Claims, 6 Drawing Sheets

(56) References Cited

U.S. PATENT DOCUMENTS

| | | |
|---|---|---|
| 5,498,224 A | 3/1996 | Kauffman et al. |
| 5,499,636 A | 3/1996 | Baggett, Jr. et al. |
| 5,559,171 A | 9/1996 | Buchanan et al. |
| 5,570,707 A | 11/1996 | Hill |
| 5,580,911 A | 12/1996 | Buchanan et al. |
| 5,599,858 A | 2/1997 | Buchanan et al. |
| 5,666,976 A | 9/1997 | Adams et al. |
| 5,692,525 A | 12/1997 | Counts et al. |
| 5,692,526 A | 12/1997 | Adams et al. |
| 5,817,159 A | 10/1998 | Cahill et al. |
| 5,900,322 A | 5/1999 | Buchanan et al. |
| 5,915,387 A | 6/1999 | Baggett, Jr. et al. |
| 5,922,110 A | 7/1999 | Weaver et al. |
| 5,922,201 A | 7/1999 | Yamamori et al. |
| 5,954,059 A | 9/1999 | Beven et al. |
| 5,988,176 A | 11/1999 | Baggett et al. |
| 5,998,500 A | 12/1999 | Cahill et al. |
| 6,026,820 A | 2/2000 | Baggett, Jr. et al. |
| 6,342,304 B1 | 1/2002 | Buchanan et al. |
| 6,429,261 B1 | 8/2002 | Lang et al. |
| 6,495,656 B1 | 12/2002 | Haile et al. |
| 6,562,938 B2 | 5/2003 | Haile et al. |
| 6,607,819 B2 | 8/2003 | Wang et al. |
| 6,673,136 B2 | 1/2004 | Gillingham et al. |
| 6,716,274 B2 | 4/2004 | Gogins et al. |
| 6,740,731 B2 | 5/2004 | Bigg et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,835,311 B2 | 12/2004 | Koslow |
| 6,872,311 B2 | 3/2005 | Koslow |
| 6,875,256 B2 | 4/2005 | Gillingham et al. |
| 6,894,100 B2 | 5/2005 | Miyoshi et al. |
| 6,924,028 B2 | 8/2005 | Chung et al. |
| 6,946,501 B2 | 9/2005 | Kochvar et al. |
| 6,955,775 B2 | 10/2005 | Chung et al. |
| 6,958,365 B2 | 10/2005 | Dontula et al. |
| 6,974,490 B2 | 12/2005 | Gillingham et al. |
| 6,994,742 B2 | 2/2006 | Barris et al. |
| 6,998,058 B2 | 2/2006 | Koslow |
| 7,008,465 B2 | 3/2006 | Graham et al. |
| 7,008,537 B2 | 3/2006 | Koslow |
| 7,115,150 B2 | 10/2006 | Johnson et al. |
| 7,211,275 B2 | 5/2007 | Ying et al |
| 7,270,692 B2 | 9/2007 | Gillingham et al. |
| 7,287,650 B2 | 10/2007 | Koslow |
| 7,323,540 B2 | 1/2008 | Velev et al. |
| 7,595,043 B2 | 9/2009 | Hedrick et al. |
| 7,615,373 B2 | 11/2009 | Simpson et al. |
| 7,723,084 B2 | 5/2010 | Wang et al. |
| 7,737,060 B2 | 6/2010 | Strickler et al. |
| 8,025,637 B2 | 9/2011 | Weber et al. |
| 8,453,653 B2 | 6/2013 | Mishra et al. |
| 2002/0092423 A1 | 7/2002 | Gillingham et al. |
| 2003/0118814 A1 | 6/2003 | Workman, Jr. et al. |
| 2003/0215624 A1 | 11/2003 | Layman et al. |
| 2004/0018226 A1 | 1/2004 | Wnek et al. |
| 2004/0116025 A1 | 6/2004 | Gogins et al. |
| 2004/0241436 A1 | 12/2004 | Hsieh et al. |
| 2004/0254286 A1 | 12/2004 | Hansen et al. |
| 2005/0058632 A1 | 3/2005 | Hedrick et al. |
| 2006/0024350 A1 | 2/2006 | Varner et al. |
| 2006/0062983 A1 | 3/2006 | Irvin, Jr. et al. |
| 2006/0083657 A1 | 4/2006 | McDonnell et al. |
| 2006/0155064 A1 | 7/2006 | Hansen |
| 2006/0163157 A1* | 7/2006 | Cote ............... B01D 63/02 210/615 |
| 2007/0232169 A1* | 10/2007 | Strickler ........... A61L 15/225 442/181 |

FOREIGN PATENT DOCUMENTS

| | | |
|---|---|---|
| GB | 2237790 A | 5/1991 |
| NZ | 198344 A | 7/1984 |
| WO | WO 98/53006 A | 11/1998 |
| WO | WO 01/27365 A1 | 4/2001 |
| WO | WO 2004/044281 A2 | 5/2004 |
| WO | WO 2006/002366 A2 | 1/2006 |
| WO | WO 2006/078516 A2 | 7/2006 |
| WO | WO 2006/099315 A2 | 9/2006 |
| WO | WO 2006/099333 A2 | 9/2006 |
| WO | WO 2006/099373 A2 | 9/2006 |

OTHER PUBLICATIONS

Paul, "Polymer Hollow Fiber Membranes for Removal of Toxic Substances from Blood," Prog. Polym. Sci., 14, 597-627 (1989).
Office Action dated Jan. 22, 2013 for Colombian Appln. No. 10.087.170.

* cited by examiner

HOLLOW/POROUS FIBERS AND APPLICATIONS THEREOF

CROSS REFERENCE TO RELATED APPLICATION

This application claims priority under 35 U.S.C. §119(e) to U.S. provisional Application No. 61/008,303, filed on Dec. 20, 2007, the entire content of which is incorporated herein by reference.

SUMMARY

Hollow and/or porous fibers and porous membranes can have uses in different applications, such as filtration, controlled release, membrane separation, analytical sciences, food industries, and pharmaceutical industries, environmental or green industries and medical industries. However, these fibers can be difficult to produce consistently and economically. There remains a need for hollow and/or porous polymeric fibers, and for polymeric compositions and processes for producing them, wherein the fibers have controllable diameters and strengths, and can be produced simply and economically.

In one embodiment is provided a polymer blend of poly(vinyl acetate) (PVAc) and poly(acrylic acid) (PAA), wherein the poly(vinylacetate) is present in an amount ranging between about 20 wt % and about 80 wt %, and poly(acrylic acid) is present in an amount ranging between about 80 wt % and about 20 wt %, based on the total weight of the blend.

In another embodiment is provided a fiber produced from a polymer blend of hydrophilic polymer and hydrophobic polymer, such as PVAc and PAA, and wherein the fiber is melt-spun and has cells therein, at least some of which form an interconnected network within the fiber. In a particular embodiment, the fiber is hollow. In another particularly preferred embodiment, at least some of these interconnected networks communicate between the interior of the fiber and the exterior of the fiber. In another particularly preferred embodiment, at least some interconnected networks of cells communicate between the hollow core of the fiber and the exterior.

In another embodiment is provided a flavorant release material comprising the porous fiber disclosed herein, and one or more flavorants disposed in a longitudinally extending core within the fiber.

In another embodiment is provided a polymer fiber membrane containing a hollow, porous fiber formed from the polymer blend disclosed herein.

In another embodiment is provided a filter containing the fiber described herein.

In another embodiment is provided a smoking article, such as a cigarette, containing a rod of smoking material, such as tobacco or tobacco substitute, and a filter containing the fibers disclosed herein.

In another embodiment is provided a process for producing the fibers disclosed herein by addition of the polymers to a compounder, extruder, or blender, and extruding or melt spinning the mixture into a fiber containing cells therein. The fiber can be spun directly from the extruder, blender, or compounder.

In a particular embodiment, the fiber, filters and method of producing the fiber include a polymer blend of poly(vinyl acetate) (PVAc) and poly(acrylic acid) (PAA), wherein the poly(vinylacetate) is present in an amount ranging between about 20 wt % and about 80 wt %, and poly(acrylic acid) is present in an amount ranging between about 80 wt % and about 20 wt %, based on the total weight of the blend. Preferred embodiments include a 20 wt % PVAc and 80 wt % PAA blend, a 40 wt % PVAc and 60 wt % PAA blend, a 50 wt % PVAc and 50 wt % PAA blend, a 80 wt % PVAc and 20 wt % PAA blend, a 60 wt % PVAc and 40 wt % PAA blend and a 80 wt % PVAc and 20 wt % PAA blend.

The embodiments described herein provide a polymer blend that can be formed into a hollow and/or cellular fiber using simple fiber spinning techniques, and that avoids the need for emulsion polymerization, the need for post-spinning heat treatments, the need for solvents, the need for the introduction of blowing agents, such as $CO_2$, or solvent-extractable cell-forming materials to the fiber melt, and the need for post-spinning stretching of the fiber.

The embodiments described herein produce fibers that are ductile, and suitable for inclusion into filter materials, such as cigarette filters, or into solid phase micro extraction materials suitable for use in analytical sciences, or into membrane separation applications. It is expected that the hollow/cellular structure of the fiber will increase the efficiency of filters made therefrom, and also help increase their ability to disintegrate on disposal. It is also expected that the porous nature of some embodiments of fiber allow the fiber to be used as a flavorant delivery system, or as a sorbent for targeted constituents in, e.g., a smoking article.

BRIEF DESCRIPTION OF THE DRAWING FIGURES

FIGS. 1A, 1B, 1C, 1D, and 1E are environmental scanning electron microscope (ESEM) images of a 20 wt % PVAc, 80 wt % PAA hollow fiber.

FIGS. 2A, 2B, 2C, are transmitted polarized light optical microscope images of a 40 wt % PVAc, 60 wt % PAA fiber according to one embodiment disclosed herein, immersed in water. FIG. 2D is a transmitted polarized light optical microscope image of a 50 wt % PVAc, 50 wt % PAA fiber according to one embodiment disclosed herein, not immersed in water. FIG. 2E is a reflected light microscope image showing the end of the 40 wt % PVAc fiber that was immersed in water.

DETAILED DESCRIPTION

Figure 1A:
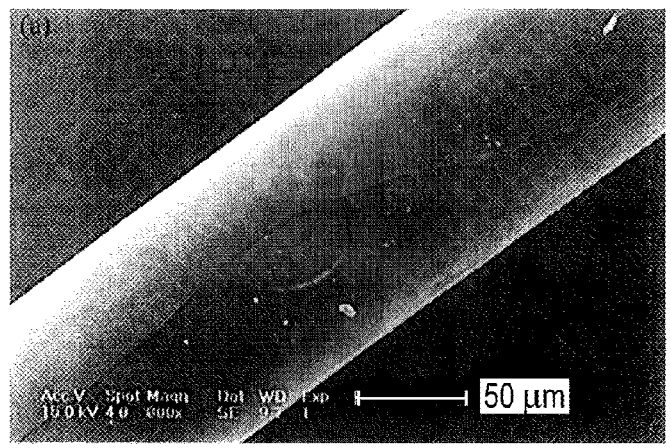
Figure 1B:
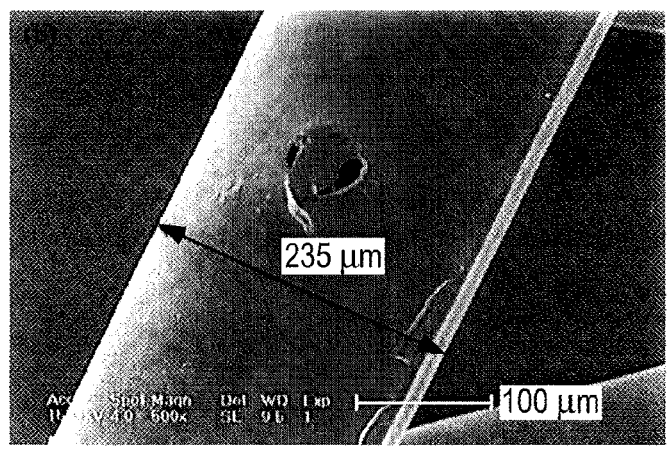
Figure 1C:
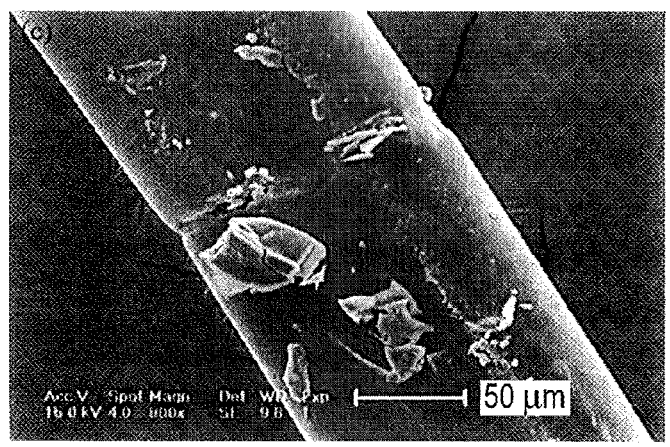
Figure 1D:
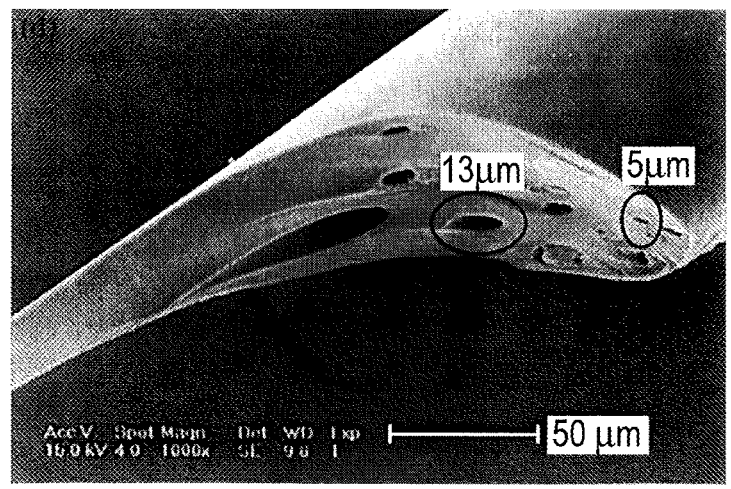
Figure 1E:
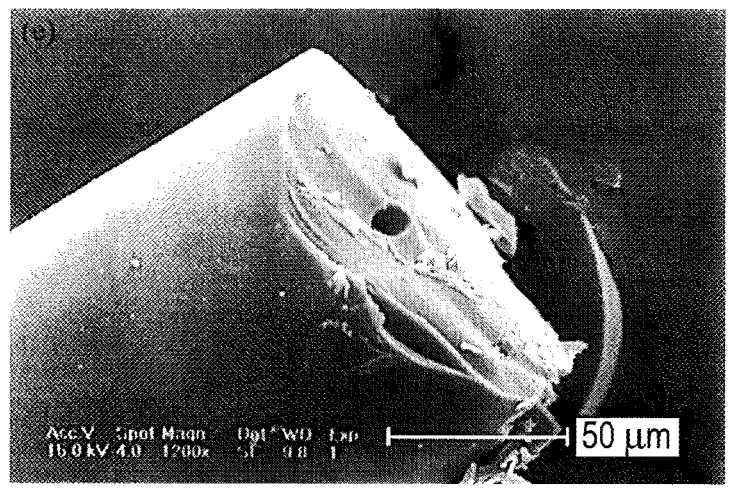

As used herein, the term "polymer blend" denotes a molten or solid mixture of two or more different polymers, whether miscible in each other or not.

As used herein, the term "poly(vinylacetate)" denotes a homopolymer formed of vinylacetate monomer or a copolymer that is formed from a monomer mixture that predominantly comprises vinylacetate monomer with a second monomer present in a molar amount that is smaller than the amount of vinylacetate monomer. Because hydrolysis of acetate moieties in vinylacetate monomer and poly(vinylacetate) is an equilibrium reaction, it is to be expected that not all hydroxy moieties in these compounds will be esterified. Accordingly, the term "poly(vinylacetate)" does not exclude polymers wherein an equilibrium level of hydrolysis has occurred under current ambient conditions.

As used herein, the term "poly(acrylic acid)" a homopolymer formed of acrylic acid monomer or a copolymer that is formed from a monomer mixture that predominantly comprises acrylic acid with a second monomer present in a molar amount that is smaller than the amount of acrylic acid monomer.

As used herein, the term "cells" denotes a region enclosed by polymer blend (i.e., a "closed" cell), as well as a region partially enclosed by polymer blend (an "open cell"). An open cell may be in fluid communication with another cell, or with a surface of the polymer blend. A cell that is in fluid communication with the surface of the polymer blend is termed a "pore" herein. Two or more cells that are open and in fluid communication with each other are denoted by the term "interconnected." Such interconnected cells can be considered to form a network of interconnected cells.

As used herein, the term "core" denotes a central, longitudinally extending region enclosed by a wall of polymer blend, but which region is itself essentially free of polymer blend. The terms "hollow" or "hollow core" denote a core that is filled with air or inert gas. Cores that are not hollow may contain one or more additive materials, such as solid, liquid, or gaseous flavorant compositions. The polymer blend surrounding the core may contain cells or pores therein, and the cells or pores, if present, may be in fluid communication with the hollow core.

As used herein, the terms "die" and "spinneret" denote processing equipment containing one or more orifices suitable for extrusion or spinning of a polymer or polymer blend to form a fiber. A die or spinneret comprising an orifice in the shape of an annulus is an "annular" die or spinneret.

As used herein, the term "post-spinning" denotes a process occurring after fiber has left the orifice of the die or spinneret. "Post-spinning heat treatment" denotes heating or annealing of the extruded or spun fiber to alter one or more of its properties after the fiber has left the orifice of the die or spinneret, in particular to modify its porosity or cellular nature, or to modify its strength. "Post-spinning stretching" denotes the application of stress or strain to the fiber for the purpose of altering one or more of its properties after the fiber has left the orifice of the die or spinneret, in particular to modify its porosity or cellular nature, or to modify its strength. "Post-spinning hydrolysation" denotes treating the fibers so as to break hydrolysable bonds therein for the purpose of altering the composition or properties of the fiber after it has left the orifice of the die or spinneret. "Post-spinning removal of extractable or hydrolysation components" denotes the removal of material from the fiber by solvent extraction, or by hydrolysation, when the removal occurs for the purpose of altering the composition or properties of the fiber after it has left the orifice of the die or spinneret.

As used herein, the term "cell-forming materials" denotes materials added to the polymer blend to create cells or pores therein. Examples include blowing agents, which expand or volatilize during the blending, extruding, or spinning process, thereby forming cells in the resulting material, as well as materials that are soluble or extractable in one or more solvents, and whose removal during solvent treatment of the extruded or spun material leaves voids behind, which form cells or pores in the material.

As used herein, the term "polymer fiber membrane" denotes a fiber having a central hollow core disposed substantially longitudinally in an annular polymeric material that contains one or more pores. The pores allow the interior of the fiber (i.e., the core) to communicate with the external surface of the fiber with respect to species to which the polymer fiber membrane is permeable. As an example, a polymer fiber membrane that is permeable to a blood protein would allow that protein to move between the fiber core and the external surface of the fiber, under the influence of a concentration gradient, in effect separating the protein from a fluid in which it has a higher concentration.

As used herein, the term "additive material" denotes any material, other than the polymer blend, air, and inert gas, that is introduced into the core of the fiber. In general, additive materials will include those materials which it is desired to deliver in a controlled fashion from the core of the fiber to the exterior of the fiber, or to which it is desired to deliver targeted constituents from the exterior of the fiber. Suitable additive materials include flavorants, sequestrants, or sorbents.

Flavorants include compositions that impart a flavor or aroma to a liquid, vapor, or gas containing them. Suitable flavorants for use in the fibers disclosed herein include, but are not limited to, menthol, peppermint, spearmint, wintergreen, cinnamon, chocolate, vanillin, licorice, clove, anise, sandalwood, geranium, rose oil, vanilla, lemon oil, cassia, fennel, ginger, ethyl acetate, isoamyl acetate, propyl isobutyrate, isobutyl butyrate, ethyl butyrate, ethyl valerate, benzyl formate, limonene, cymene, pinene, linalool, geraniol, citronellol, citral, peppermint oil, orange oil, coriander oil, borneol, fruit extract, tobacco flavor or extract, and combinations of these. A particularly preferred flavorant is menthol.

Suitable sorbents include any material capable of adsorbing or absorbing certain constituents with which the sorbent comes into contact, and includes both absorbents and adsorbents, such as carbons, such as activated carbon, graphite and charcoal, aluminas, including activated aluminas, zirconias, titanium oxides, molecular sieves, silica gels, zeolites, polymeric resins, and combinations of these.

In one embodiment is provided a polymer blend comprising poly(vinylacetate) and poly(acrylic acid). In general, the poly(vinylacetate) is present in an amount ranging from about 20 wt % to about 80 wt %, and poly(acrylic acid) in an amount ranging from about 80 wt % to about 20 wt %, based on the total weight of the blend. At levels of poly (vinylacetate) above about 80 wt % and at levels of poly (acrylic acid) above about 80 wt %, it becomes difficult to obtain a material having sufficient ductility, or that is fiberizable using melt-spinning techniques, although a cellular structure is still obtained. In a more preferred embodiment, the above ranges are of the amounts of poly(vinylacetate) and poly(acrylic acid) homopolymer.

It has been found that this blend of polymers can provide a hollow or porous fiber that unexpectedly, and unlike the fiber disclosed in Yamamori et al., U.S. Pat. No. 5,922,201 or the fiber disclosed in Gillingham et al., U.S. Patent Application Publication 2004/0226443, contains cells in the polymeric fiber wall. Even more unexpectedly, these cells can be provided using simple melt spinning processes, without the need for the addition of a pore-forming material to be extracted later, and without the need for solution spinning, contrary to the teachings of Paul, "Polymer Hollow Fiber Membranes for Removal of Toxic Substances from Blood," *Prog. Polym. Sci.,* 14, 597-627 (1989).

A more ductile, stronger, more easily fiberizable blend can be obtained when the concentration of poly(vinylacetate) ranges from about 30 wt % to about 70 wt %, more particularly from about 40 wt % to about 60 wt %, and even more particularly is about 50 wt %, based on the total weight of the blend. Similarly, ductile, strong, easily fiberizable blends with cellular structures can be obtained when the concentration of poly(acrylic acid) ranges from about 30 wt % to about 70 wt %, more particularly from about 40 wt % to about 60 wt %, and even more particularly is about 50 wt %, based on the total weight of the blend. In a particular embodiment, the polymer blend consists essentially of poly (vinylacetate) homopolymer and poly(acrylic acid) homopolymer, each in amounts given above.

In another embodiment is provided a fiber comprising a polymer blend hydrophobic polymer and hydrophilic polymer; in a particular embodiment, a blend of poly(vinyl acetate) and poly(acrylic acid), wherein the fiber has cells therein. The cells can form an interconnected network of cells within the fiber, and in a preferred embodiment, this interconnected network of cells can provide fluid communication with the exterior of the fiber.

In a more particular embodiment, the fiber can include an annular wall comprising one or more cells therein, and a core extending longitudinally within the annular wall. The core can generally range in diameter from about 5 µm to about 15 µm. In a preferred embodiment, the cells in the annular wall provide fluid communication between the exterior of the fiber and the core. The annular wall comprises the polymer blend described herein. The core of the fiber can be hollow, or may contain an additive introduced therein during manufacture or use of the fiber. Preferably, the additive includes one or more flavorant compounds, as described above. While not wishing to be bound by any theory, it is believed that the flavorant compounds, when heated (e.g., by a passing hot gas stream, such as mainstream cigarette smoke) can become volatilized, more mobile, or both, and diffuse through the fiber wall and to its exterior surface, where they can be carried off and delivered by the passing vapor stream.

In another embodiment is provided a polymer fiber membrane comprising the hollow fiber with an interconnected network of cells in the polymer blend, described above.

A polymer fiber membrane formed from hollow fibers containing the polymer blends described herein can be adapted for use in a variety of membrane separation processes, such as protein purification, plasma separation, dialysis, ultrafiltration, and the like, in a manner similar to that disclosed in Paul, "Polymer Hollow Fiber Membranes for Removal of Toxic Substances from Blood," *Prog. Polym. Sci.,* 14, 597-627 (1989).

In another embodiment is provided a filter material comprising the fiber disclosed above The filter material can be in the form of a filter plug, nonwoven fabric, pleated paper, or other structure, and may be advantageously used in filtering targeted constituents from smoke. Accordingly, the filter material may be disposed at the end of a rod of smokable material, such as tobacco or tobacco-substitute, as part of a smoking article, such as a cigarette.

The filters disclosed herein may be used with both traditional and nontraditional cigarettes. Nontraditional cigarettes can include electrically heated cigarettes, or cigarettes having a fuel element in the tobacco rod. Traditional cigarettes generally have a substantially cylindrical rod shaped structure which typically includes a roll or column of smokable material, such as shredded tobacco, surrounded by a paper wrapper. Many types of cigarettes may have a cylindrical filter portion aligned in an end-to-end relationship with the tobacco rod. The filter portion can comprise one or more plugs formed from a cellulose acetate tow circumscribed by a paper material known as "plug wrap" thereby forming a "filter plug." Typically, the filter portion is attached to one end of the tobacco rod using a circumscribing wrapping material known as "tipping paper."

Cigarettes for electrical smoking systems are described in commonly-assigned U.S. Pat. Nos. 6,026,820; 5,988,176; 5,915,387; 5,692,526; 5,692,525; 5,666,976; and 5,499,636. Other non-traditional cigarettes include those having a fuel element in the tobacco rod as described in U.S. Pat. No. 4,966,171.

The filter material made from the fiber disclosed herein can desirably be formed into a plug by forming the fibers into a tow, forming the tow into a plug, and attaching the plug to a rod of smokable material using plug wrap.

Typically, the smokable material contains tobacco or a tobacco substitute. Examples of suitable types of tobacco materials may include, but are not limited to, flue-cured tobacco, Burley tobacco, Maryland tobacco, Oriental tobacco, rare tobacco, specialty tobacco, reconstituted tobacco, agglomerated tobacco fines, blends thereof and the like. Preferably, the tobacco or tobacco substitute is pasteurized. Some or all of the tobacco material may be fermented.

Further, the tobacco or tobacco substitute may be used in any suitable form, including shreds and/or particles of tobacco lamina, processed tobacco materials, such as volume expanded or puffed tobacco, or ground tobacco, processed tobacco stems, such as cut-rolled or cut-puffed stems, reconstituted tobacco materials, blends thereof, and the like. Genetically modified tobacco may also be used.

In another embodiment is provided method for preparation the fibers described herein, comprising:
 (a) adding poly(vinyl acetate) to poly(acrylic acid) to form a spinning mixture;
 (b) flowing the spinning mixture directly through a die or spinneret to form a fiber.

The die or spinneret used to form the fiber can have an annular configuration. For example, a spinneret having an annular orifice or aperture through which the liquefied spinning mixture is forced can be used to form the wall of the hollow fiber structure described herein. In a particular embodiment, a coaxial central orifice in the spinneret can be used to introduce a material to fill the core or lumen of the fiber with a desired material, typically a gas or liquid, which serves to inflate the core of the fiber and prevent it from collapsing during the spinning process. Such a die or spinneret can be disposed at the outlet of a conventional compounder or extruder, such as a twin screw extruder, which may desirably be equipped with heating or cooling apparatus to maintain the desired fiberization temperature. However, it may be possible to obtain the desired polymer melt without added heating, as the shear stress imposed by the extruder or compounder can increase the temperature of the spinning mixture sufficiently to melt the components thereof.

If the shear stress imposed by the compounder or extruder is not sufficient to melt the components of the spinning mixture, then heating may be required to liquefy the components. Such heating is desirably carried out until the spinning mixture has reached the melting point of the mixture of polymers, typically that of the highest melting component of the mixture, typically a temperature of about 150° C. Preferably, the method does not require or include post-spinning heat treatment of the fibers, post-spinning stretching of the fibers, addition of cell-forming materials to the spinning mixture, post-spinning hydrolysation of polymer, or post-spinning removal of extractable or hydrolysation components. The desired hollow, cellular or porous structure is obtainable without the need for such process steps as the result of the use of the polymer blend described herein.

Fiber diameter can be controlled by controlling the take-up speed of the fiber during fiberization. In a bench top instrument, the take-up speeds can generally vary from about 5 m/min to about 100 m/min. At the slower take-up speeds, the fiber diameter is thicker, but also less uniform, and can generally range in thickness from about 100 μm to about 400 μm. At higher take-up speeds, the fiber diameter becomes more uniform and also thinner, and at a take-up speed of about 100 m/min is generally about 50 μm. However, by increasing take-up speed further, it may be possible to decrease fiber diameter to less than 10 μm. The fiber diameter can be decreased much further during the actual scale-up by using industrial scale fiber spinning units.

In addition, the fiber can contain one or more additives in its core. As described above, these additives may be solid, liquid or gaseous, and may be introduced into the fiber core via one or more of several techniques. In one embodiment, the additive can be introduced to the fiber core through a central orifice in the die or spinneret, along with any gas or liquid supplied to keep the core open during fiber formation. For example, flavorant compositions or sorbents can be introduced by entraining them in a gas or vapor stream passing through the die or spinneret, so that they become entrapped in the fiber core. In another embodiment, the fibers can be immersed or sprayed with a solution or suspension of the flavorant, which can then diffuse through the fiber walls via the cells in the fiber walls, and can be retained by the fiber when it is removed from the bath or spray chamber.

Over time, flavorant compositions can volatilize and diffuse through the cells in the fiber walls. When these cells are interconnected and in fluid communication with both the core and the exterior of the fiber, they form pores that provide a pathway for the volatilized flavorant to travel through the fiber, and escape into the area surrounding the fiber, where the flavorant can then be delivered to the user. For example, menthol vapor or solution can be delivered into the fiber core through the central orifice in an annular spinneret. The resulting menthol-impregnated fiber can then be incorporated into a smoking article, such as in a cigarette filter plug. When the cigarette is used, the mainstream smoke passing through the filter plug heats the menthol contained in the fiber, helping to volatilize it and increase its diffusivity through the pores connecting the core of the fiber with its exterior surface. As menthol is released from the fiber, it is entrained in the mainstream smoke and delivered to the user. Prior to use, however, the tortuous nature of the network of cells forming the pores in the fiber reduce the ability of the menthol to diffuse and migrate from the fiber.

In similar fashion, a sorbent or sequestrant can be introduced into the core of the fiber during the spinning process. The fiber can then be formed into a filter plug, and targeted constituents in the mainstream smoke can become trapped in the fiber by entering the pores in the external surface of the fiber. The targeted constituents can diffuse through the fiber toward its core, where they become sorbed by the sorbent, and retained in the fiber until the smoking article is disposed of.

Other techniques can be used to introduce additives to the fiber core, including spraying the fibers with, or dipping the fibers in, a solution of dispersion containing the additive so that the additive diffuses through the fiber to its core.

The porosity of the fiber (i.e., the number and size of pores on the surface of the fiber) can be controlled by coating a portion of the fiber surface. Pore sizes can desirably range from about 2 μm to several hundred μm, more particularly from about 5 μm to about 50 μm. Desirably, the coating is one that will dissolve when exposed to a hot, moist environment like that of mainstream cigarette smoke. This allows for fiber porosity (and menthol diffusion from the fiber) to be very restricted during storage of a smoking article, and for both of these parameters to increase significantly when the smoking article is used.

EXAMPLE 1

Figure 2A:
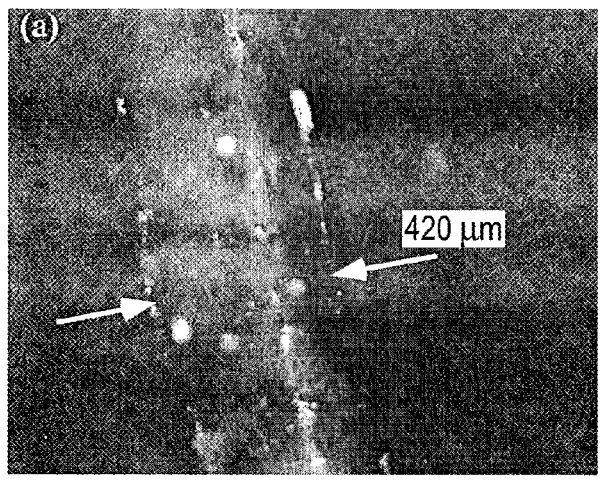
Figure 2B:
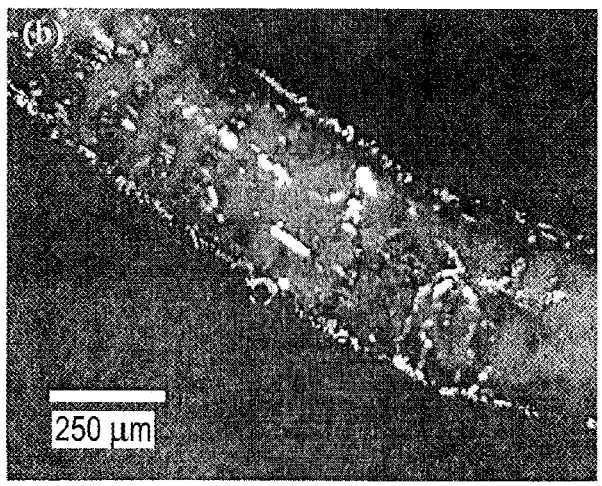
Figure 2C:
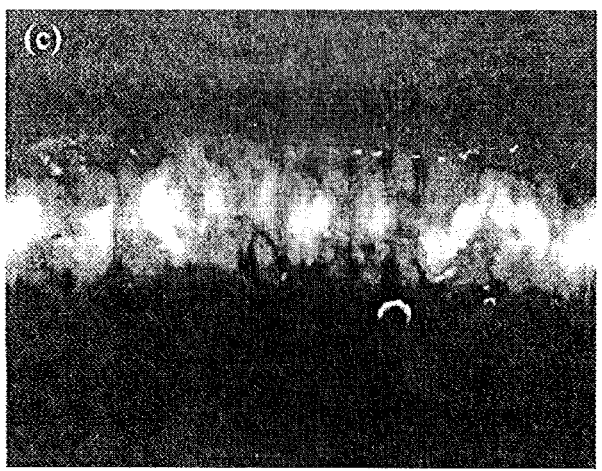
Figure 2D:
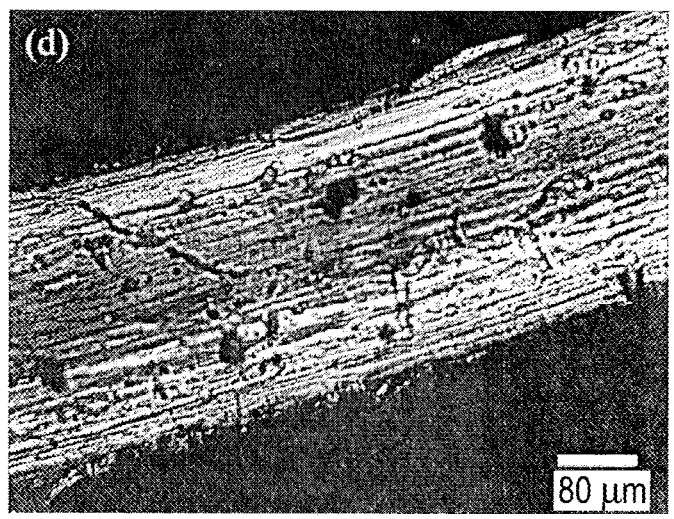
Figure 4:
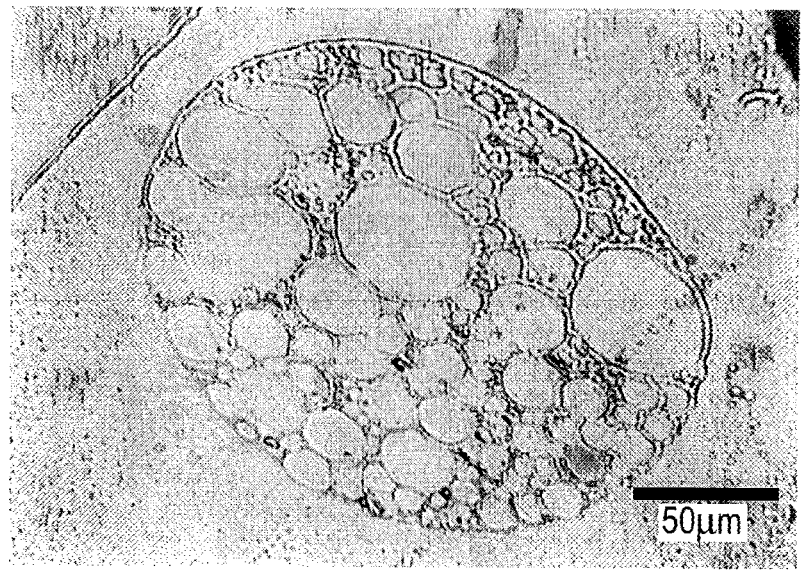
FIG. 4 is a cross sectional transmitted light optical microscope image of a 5 μm thick section of a 50 wt % PVAc, 50 wt % PAA fiber according to one embodiment disclosed herein, cut perpendicular to the fiber axis.

1 gram of poly(vinylacetate) is added to 1 gram of poly(acrylic acid) in a micro-compounder and heated and blended for 2 minutes at a temperature of 150° C. at a blending speed of 100 rpm. The resulting polymer melt is pulled directly from the die of the micro-compounder, and spun into fiber using a spinning line and a bobbin with a winding speed of 5 m/min. The fibers obtained are photographed using an Olympus BX60 Petrographic Light Microscope operating with transmitted polarized light. A transverse cross section of the fiber is shown in FIG. 4 and shows the cellular structure of the fibers. A longitudinal image of the is shown in FIG. 2D.

EXAMPLE 2

Figure 5:
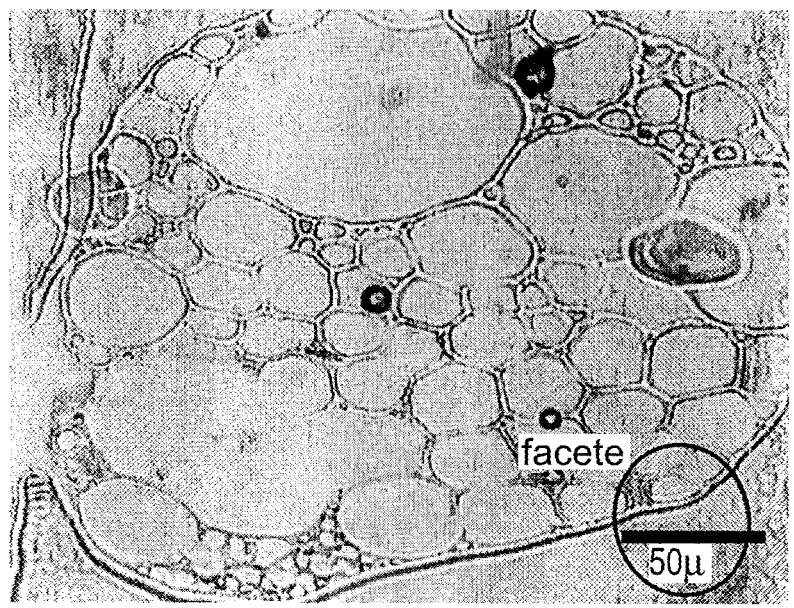
FIG. 5 is a cross sectional transmitted light optical microscope image of a 5 μm thick section of a 60 wt % PVAc, 40 wt % PAA fiber according to one embodiment disclosed herein, cut perpendicular to the fiber axis.
Figure 6:
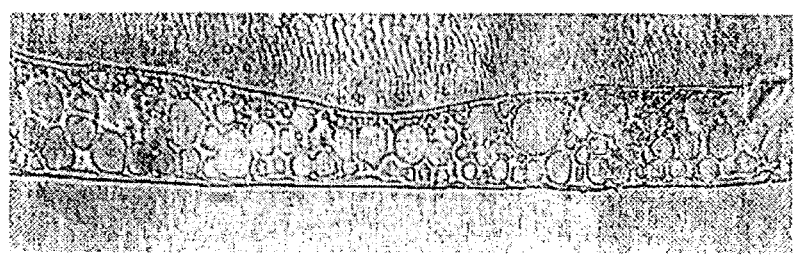
FIG. 6 is a transmitted light optical microscope image of a longitudinal section of a 60 wt % PVAc, 40 wt % PAA fiber according to one embodiment disclosed herein, cut parallel to the fiber axis.

A procedure similar to that of Example 1 was followed, except that the amount of each polymer added to the micro-compounder is varied to obtain a blend and fibers having 60 wt % poly(vinylacetate), 40 wt % polyacrylic acid. The melt spun fibers are imaged as indicated in Example 1, and the resulting images shown in FIGS. 5 and 6. The cellular nature of the fiber is clearly visible.

EXAMPLE 3

Figure 2E:
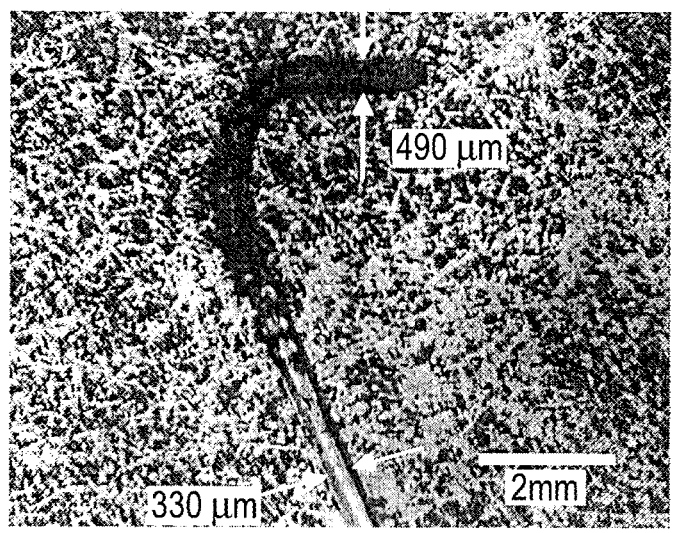
Figure 3:
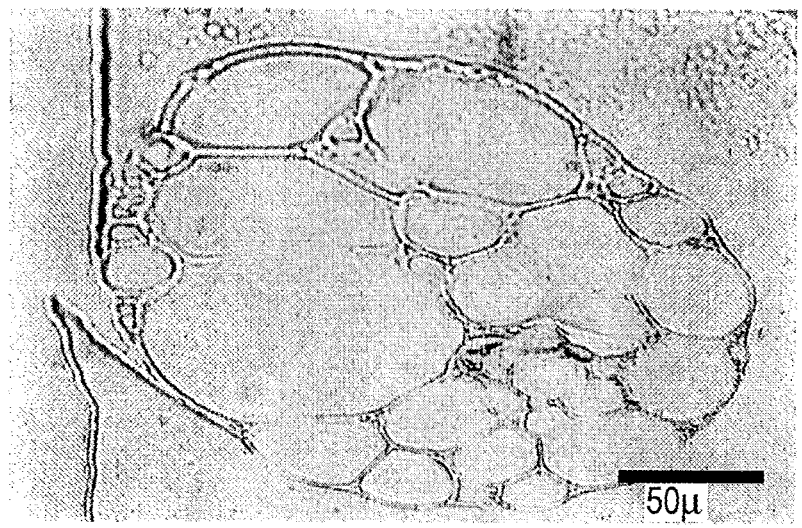
FIG. 3 is a cross sectional transmitted light optical microscope image of a 5 μm thick section of a 40 wt % PVAc, 60 wt % PAA fiber according to one embodiment disclosed herein, cut perpendicular to the fiber axis.

A procedure similar to that of Example 1 was followed, except that the amount of each polymer added to the micro-compounder is varied to obtain a blend and fibers having 40 wt % poly(vinylacetate), 60 wt % polyacrylic acid. The melt spun fibers are cut into a 5 μm diameter cross section and imaged using a transmitted polarized light optical microscope, and the results shown in FIG. 3. These fibers are immersed in water and imaged using a transmitted polarized light optical microscope, and the resulting images shown in FIGS. 2A, 2B, and 2C. The portion of the fiber that was immersed in water, and the resulting swelling over a longer length of the fiber is imaged using a reflective light microscope, and is shown in FIG. 2E. Swelling was observed in the fiber above the water line, such that the fiber essentially doubled in diameter.

EXAMPLE 4

A procedure similar to that of Example 1 is followed, except that the amount of each polymer added is varied to obtain a 20 wt % poly(vinylacetate), 80 wt % polyacrylic acid blend fiber. The ESEM images in FIGS. 1A, 1B, 1C, 1D, and 1E show that the fiber forms cells therein.

EXAMPLE 5

Pure poly(vinylacetate) and pure poly(acrylic acid) are separately formed into fibers. The resulting fibers are solid, without the cellular structure observed for the fibers made from blends described herein.

By contrast to the results obtained with pure poly(vinylacetate) and pure poly(acrylic acid), the fibers obtained from the polymer blends of 40/60, 50/50, and 60/40 weight percents PVAc/PAA contained a randomly sized honeycomb structure within the fiber wall, with visible interconnectivity of the internal cells. The cell wall thicknesses were relatively consistent in all of the fibers prepared from the polymer blend.

In addition, fibers made from pure PVAc or pure PAA were difficult to fiberize by melt spinning, and were very fragile. Fibers prepared from blends of PVAc and PAA were easily melt spun into porous fibers that maintained their fiber integrity.

Fibers prepared from blends of PVAc and PAA also have been demonstrated to have the ability to wick water, which may be attributable to either capillary action, adsorption, or a combination of these mechanisms.

While the description herein contains reference to certain preferred embodiments, it is to be understood that variations and modifications thereof will be apparent to those skilled in the art, and that such variations and modifications are to be considered within the purview and scope of the invention as defined by the claims appended hereto.

All of the above-mentioned references are incorporated herein by reference in their entirety to the same extent as if each individual reference was specifically and individually indicated to be incorporated herein by reference in its entirety.

What is claimed is:

1. A method for preparation of a fiber comprising a polymer blend comprising poly(vinylacetate) in an amount ranging between about 20 wt % and about 80 wt %, and poly(acrylic acid) in an amount ranging between about 80 wt % and about 20 wt %, based on the total weight of the polymer blend, the method comprising:
    adding the poly(vinylacetate) to the poly(acrylic acid) to form a spinning mixture; and
    flowing the spinning mixture directly through a die or spinneret to form a fiber having cells therein, and wherein at least some of the cells are closed cells, which are regions completely enclosed by the polymer blend and at least some of the cells form an interconnected network within the fiber.

2. The method of claim 1, wherein the die or spinneret comprises an annular spinneret, and wherein the fiber comprises an annular wall of polymeric material having cells therein, and a longitudinally extending core.

3. The method of claim 2, comprising:
    introducing a gas or vapor stream through a central opening in the die or spinneret into the longitudinally extending core of the fiber.

4. The method of claim 3, wherein the gas or vapor comprises an additive.

5. The method of claim 1, comprising:
    heating the spinning mixture to raise its temperature to around 150° C.

6. The method of claim 1, wherein the method does not include post-spinning heat treatment of the fibers, post-spinning stretching of the fibers, addition of cell-forming materials to the spinning mixture, post-spinning hydrolysation of polymer, or post-spinning removal of extractable or hydrolysation components.

7. The method of claim 1, wherein the poly(vinyl acetate) is present in an amount ranging from about 30 wt % to about 70 wt % and the poly(acrylic acid) is present in an amount ranging from about 70 wt % to about 30 wt %, based on the total weight of the polymer blend.

8. The method of claim 7, wherein the poly(vinyl acetate) is present in an amount ranging from about 40 wt % to about 60 wt % and the poly(acrylic acid) is present in an amount ranging from about 60 wt % to about 40 wt %, based on the total weight of the polymer blend.

9. The method of claim 8, wherein the poly(vinyl acetate) is present in an amount of about 50 wt % and the poly(acrylic acid) is present in an amount of about 50 wt %, based on the total weight of the polymer blend.

10. The method of claim 1, wherein the fiber comprises:
    (a) an annular wall comprising the cells therein; and
    (b) a core extending longitudinally within the annular wall.

11. The method of claim 10, wherein the core is hollow and the core diameter ranges between about 5 μm and about 15 μm.

12. The method of claim 10, comprising:
    disposing an additive material within the core.

13. The method of claim 10, wherein at least a portion of the cells communicate with the fiber surface.

14. The method of claim 13, wherein at least a portion of the cells provide fluid communication between the core and the fiber's exterior.

15. The method of claim 1, wherein the fiber has a diameter ranging between about 10 μm and about 400 μm and the fiber is porous with a pore size of about 2 μm to about 50 μm.

16. The method of claim 1, comprising:
    forming a filter material comprising the fiber.

17. A method of forming a smoking article, comprising:
    forming a spinning mixture comprising a polymer blend comprising poly(vinylacetate) in an amount ranging between about 20 wt % and about 80 wt %, and poly(acrylic acid) in an amount ranging between about 80 wt % and about 20 wt %, based on the total weight of the polymer blend;
    flowing the spinning mixture directly through a die or spinneret to form a fiber having cells therein;
    forming a filter material comprising the fiber; and
    attaching a rod of smokable material to one end of the filter material.

18. The method of claim 17, wherein the smoking article is a cigarette and the fiber has a hollow core containing a flavorant.

19. The method of claim 17, wherein the fiber has a diameter ranging between about 10 μm and about 400 μm and the fiber is porous with a pore size of about 2 μm to about 50 μm.

* * * * *